United States Patent

[11] 3,592,347

[72] Inventors Robert R. Kelly
Hoffman Estates;
James R. Tomashek, Wood Dale; Donald H. Ward, Glen Ellyn, all of, Ill.
[21] Appl. No. 790,643
[22] Filed Jan. 13, 1969
[45] Patented July 13, 1971
[73] Assignee Borg - Warner Corporation
Chicago, Ill.

[54] PIPE POSITION INDICATOR FOR PIPE RACKERS
11 Claims, 9 Drawing Figs.
[52] U.S. Cl. .................................................. 214/2.5, 114/.5 D
[51] Int. Cl. ..................................................... E21b 19/00
[50] Field of Search ........................................... 214/2.5, 1 RCM; 114/.5 D; 175/85, 52

[56] References Cited
UNITED STATES PATENTS
2,628,725  2/1953  Stone ........................... 214/2.5
2,730,246  1/1956  Stone ........................... 214/2.5
2,942,736  6/1960  Landsiedel et al. ........... 214/1 (RCM) X Primary Examiner—Robert G. Sheridan
Assistant Examiner—Frank E. Werner
Attorneys—Donald W. Banner, Lyle S. Motley, C. G. Stallings and William S. McCurry ABSTRACT: A pipe position indicator for pipe rackers, in which the position of a stand of pipe is shown for each of two axes on a pair of dials, one of which dials shows gross positioning and the other of which dials shows fine positioning, with respect to the well centerline and the racked positioned of the pipe stand.

INVENTORS.
ROBERT R. KELLY
JAMES R. TOMASHEK
BY DONALD H. WARD

B. G. Stallings
ATTORNEY

INVENTORS.
ROBERT R. KELLY
JAMES R. TOMASHEK
BY DONALD H. WARD

C. G. Stallings
ATTORNEY

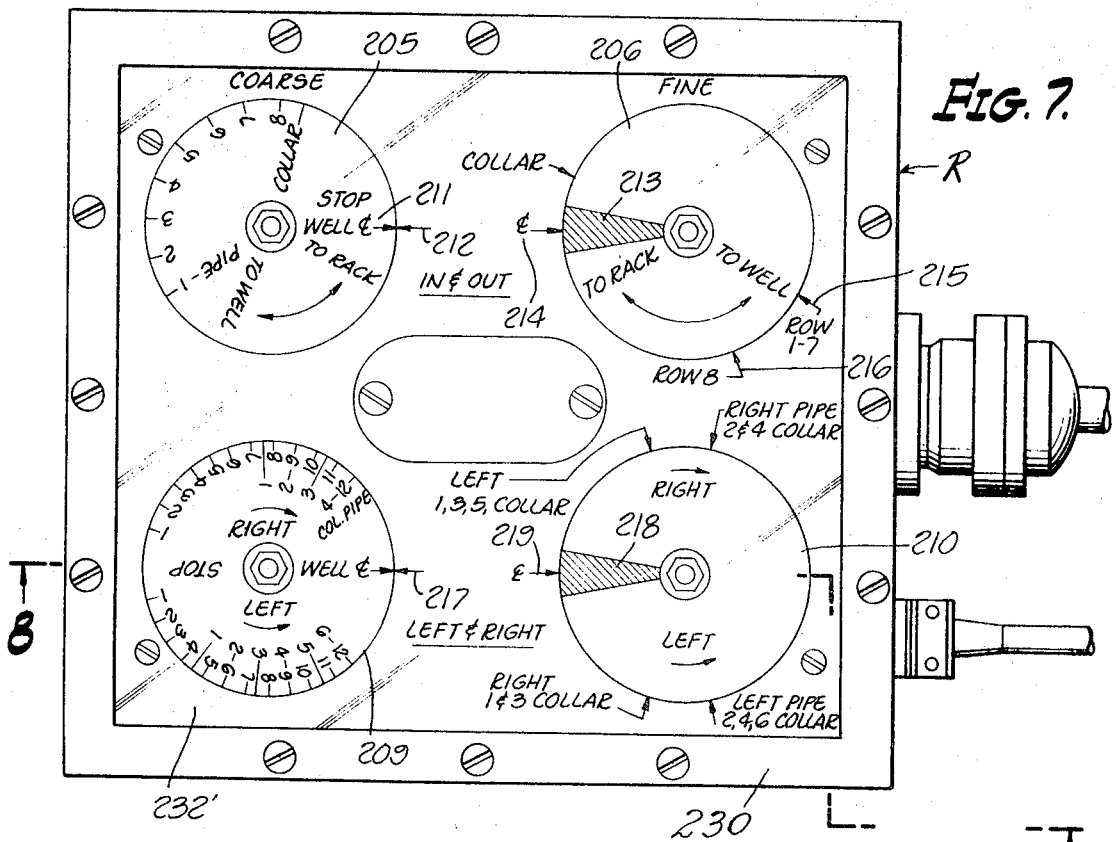
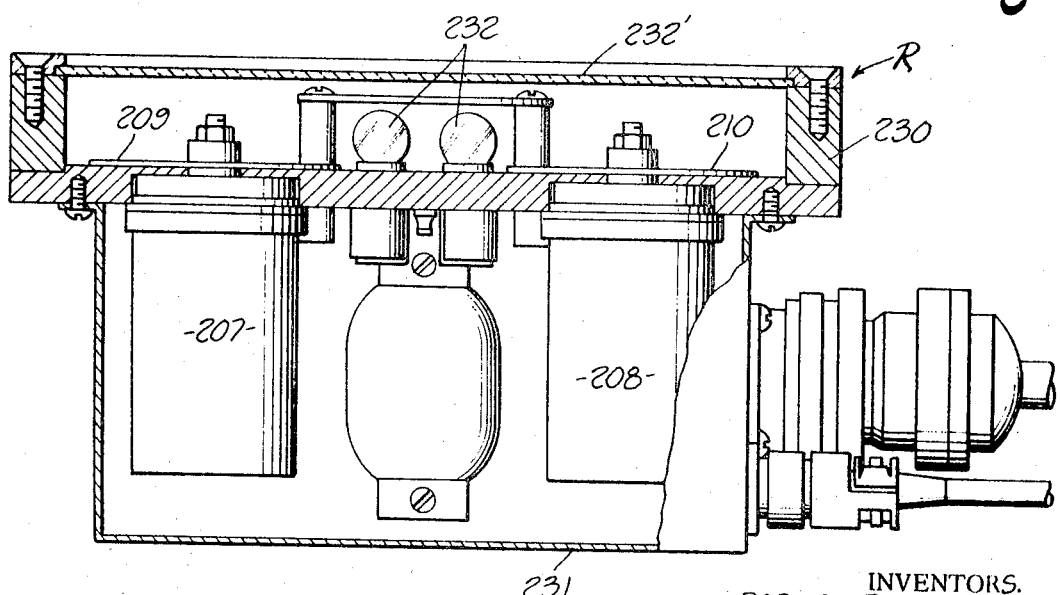

PIPE POSITION INDICATOR FOR PIPE RACKERS

BACKGROUND OF THE INVENTION

The operation of pipe-racking apparatus wherein stands of pipe are successively moved between positions at the centerline of the well-drilling derrick and a racked position in, for example, a finger board having a plurality of longitudinally extended, laterally spaced fingers defining elongated pipe-receiving openings spaced progressively laterally with respect to the well centerline, sometimes poses problems for the operator in that he may be unable to clearly see the precise location of the pipe when it is at the well centerline, on the one hand, or when it is at a desired position for racking, on the other hand. For example, inclement weather may hamper visibility, particularly if the pipe-racking apparatus forms part of a derrick situated on a floating vessel at sea. However, in the utilization of such racking apparatus it is necessary that the pipe be properly positioned either at the well centerline in the case of making up a drill pipe string or at the desired racked location when the drill string is being pulled, and vice versa, so that the other operations of the pipe-handling equipment may be accomplished with certainty and the pipe racker apparatus itself will be efficient in its operation. Moreover, if pipe racker apparatus of the type generally discussed above is to be fully automatic, then it is necessary that the precise location of the pipe stands be not only known but accomplished without error so that automated systems may reliably proceed in the step by step manipulation of the well-drilling derrick either in the drilling of a well or in the round tripping of the well-drilling pipe.

SUMMARY OF THE INVENTION

The present invention provides position indicator means for use in well pipe racking apparatus, whereby the position of a pipe stand with respect to the centerline of the well or with respect to the pipe racker finger board may be clearly indicated at a convenient location.

In accomplishing the foregoing, the position indicator means may be combined with pipe racker apparatus, such as, for example, that more particularly illustrated and described in the application for Letters Patent of the United States filed May 23, 1968, Ser. No. 731,542, in the name of John W. Turner, Jr. for WELL PIPE RACKER, now U.S. Pat. No. 3,561,811, issued Feb. 9, 1971. In such well pipe racker the derrick may be provided with a control console on the derrick floor operable by a floor man and another such console aloft in the derrick operable by a derrick man, at each of which consoles there may be provided a position-indicating receiver which is responsive to the position of the racker apparatus which moves stands of pipe between positions aligned with the centerline of the well and laterally displaced therefrom in racked positions.

More specifically, racker apparatus in accordance with the above-identified application for Letters Patent and other racker apparatus useful in combination with the present invention may comprise a racker arm longitudinally extended in a horizontal plane and shiftably supported in a carriage for movement toward and away from the centerline of the well, the carriage itself being movable laterally with respect to the plane movement of the arm. The racker arm is provided with a racker head adapted to engage and support a length of drill pipe to move the same between a racked position and a position at the well centerline. The indicator means of the invention whereby the position of the pipe will be indicated is adapted to show the position of the racker head which supports the pipe stand and, in accordance with the present invention, includes transmitter means carried by the shiftable racker apparatus for transmitting a signal to receiver means located, for example, at one or both of the control consoles, the receiver means reacting to the signal transmitted by the transmitter means to indicate the position of the stand of well pipe supported by the racker apparatus.

BRIEF DESCRIPTION OF THE DRAWINGS

FIG. 7 is a top plan view of a position indicator receiver in accordance with the invention;

FIG. 8 is a view in section, as taken on the line 8-8 of FIG. 7; and

DESCRIPTION OF THE PREFERRED EMBODIMENT

Figure 1:
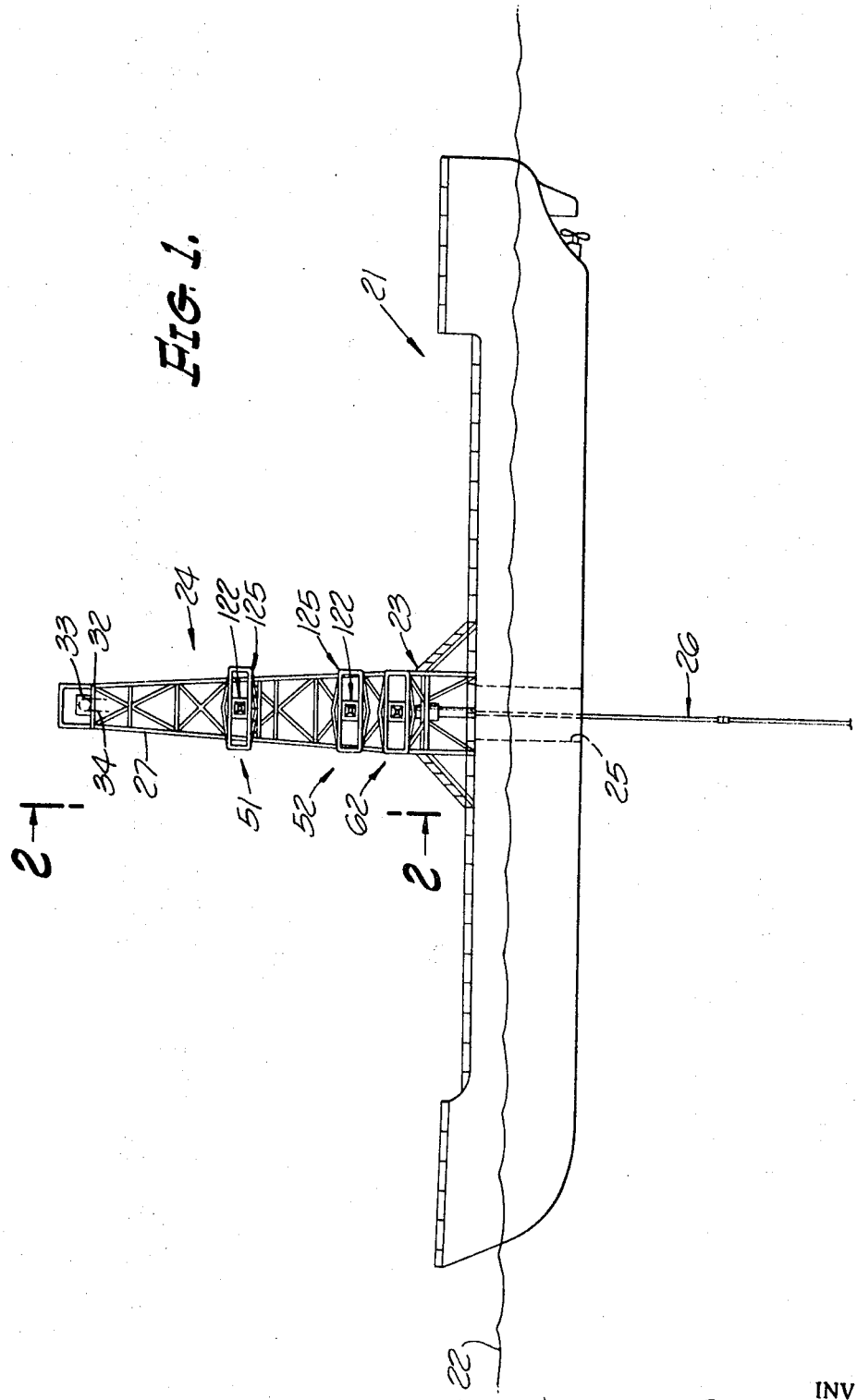
FIG. 1 is a side elevational view of a drilling ship having a derrick assembly, and including racker apparatus useful with the present invention.
Figure 2:
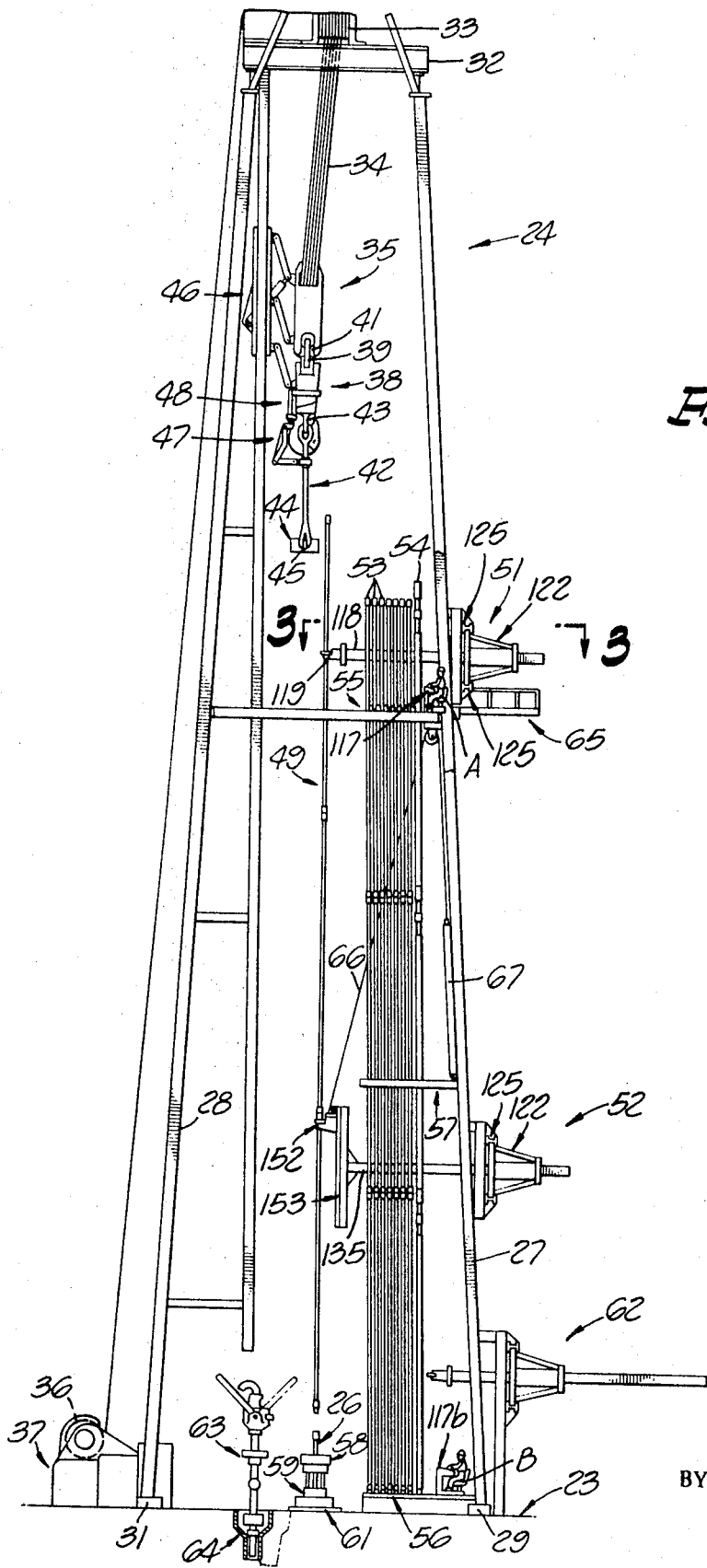
FIG. 2 is an enlarged side elevational view of the derrick assembly, taken on the line 2-2 of FIG. 1.

Referring to FIGS. 1 and 2, there is shown a drilling ship 21 afloat in the water, the surface of the water being designated 22. The ship has an elevated platform 23 positioned amidships. Erected on the platform is a drilling derrick 24. The ship has a moon hole 25 through which a drill string 26 extends from above the platform 23 into the water and thence into the earth (not shown) below. As this type of drilling ship with a platform and derrick is widely known in the field to which the invention pertains, it need not be described here in further detail.

The derrick 24 is shown somewhat schematically, sway braces, guy wires and similar structural members being omitted to enable working apparatus to be shown more clearly. The derrick has generally vertical cornerposts 27 and 28 supported on the platform 23 on base members 29 and 31. A water table 32 near the top of the derrick carries the usual crown block 33 which is aligned with the vertical centerline of the derrick. Suspended from the crown block by cable 34 is a traveling block 35. As is usual, one end (not shown) of the cable 34 is anchored to the ship structure, and the other end is led to the spool 36 of a draw works 37 for raising and lowering the traveling block and the load supported thereby.

A hook structure 38 is swingably suspended from the bottom of the traveling block 35 by interengaged bails 39 on the hook and 41 on the block. An elevator link 42 is swingably suspended from an ear 43 on the hook sructure, and the link has an elevator 44 swingably attached by another ear 45 to the lower end of the link 42. A second elevator link (not seen in FIG. 2) on the other side of the hook structure 38 similarly connects the elevator 44 to the hook structure 38.

The general reference numeral 46 denotes apparatus for positioning and guiding the block and hook structure. An elevator link stabilizing device is designated by the general reference numeral 47. The general reference numeral 48 designates apparatus for supplying compressed air to the elevator 44 to actuate it. The details of the herein-illustrated hook stabilizing and positioning means 46, the link stabilizing means 47, and the means 48 for supplying air to the elevator 44 are more particularly disclosed as follows:

Jones and Turner, Jr., Block and Hook Structure Positioning and Guiding Apparatus, U.S. Pat. No. 3,507,405; Langowski and Turner, Jr., Link Stabilizer for Well Drilling Rigs, U.S. Pat. No. 3,526,425; McFadden, Fluid Conductor Means for Hook Mounted Elevator, U.S. Pat. No. 3,479,062; and Turner, Jr., Stabilized Pipe Supporting Structure for Drilling Rigs, U.S. Pat. No. 3,498,586.

A stand 49 of drill pipe is shown as being supported by pipe-handling equipment including an upper racker assembly 51 and an intermediate pipe-supporting racker assembly 52, which will be hereinafter described. Other stands 53 of drill pipe or drill collars 54 are shown at rest in a pipe rack having a finger board 55, a base 56, and an intermediate rack member 57. The upper end of the string of drill pipe 26 is shown projecting above the power tongs 58, the slips 59, and the rotary table 61. Casing manipulating apparatus is shown at 62. A swivel and kelly assembly 63 is disposed in the rathole 64.

Projecting outwardly from the derrick and positioned under the racker 51 is a horizontal stage 65 upon which an operator may stand to adjust or repair the racker.

Associated with the racker 52 is a cable 66 actuated by a fluid-powered piston-and-cylinder motor 67 for raising and lowering the racker head, as will be hereinafter described in detail.

Figure 3:
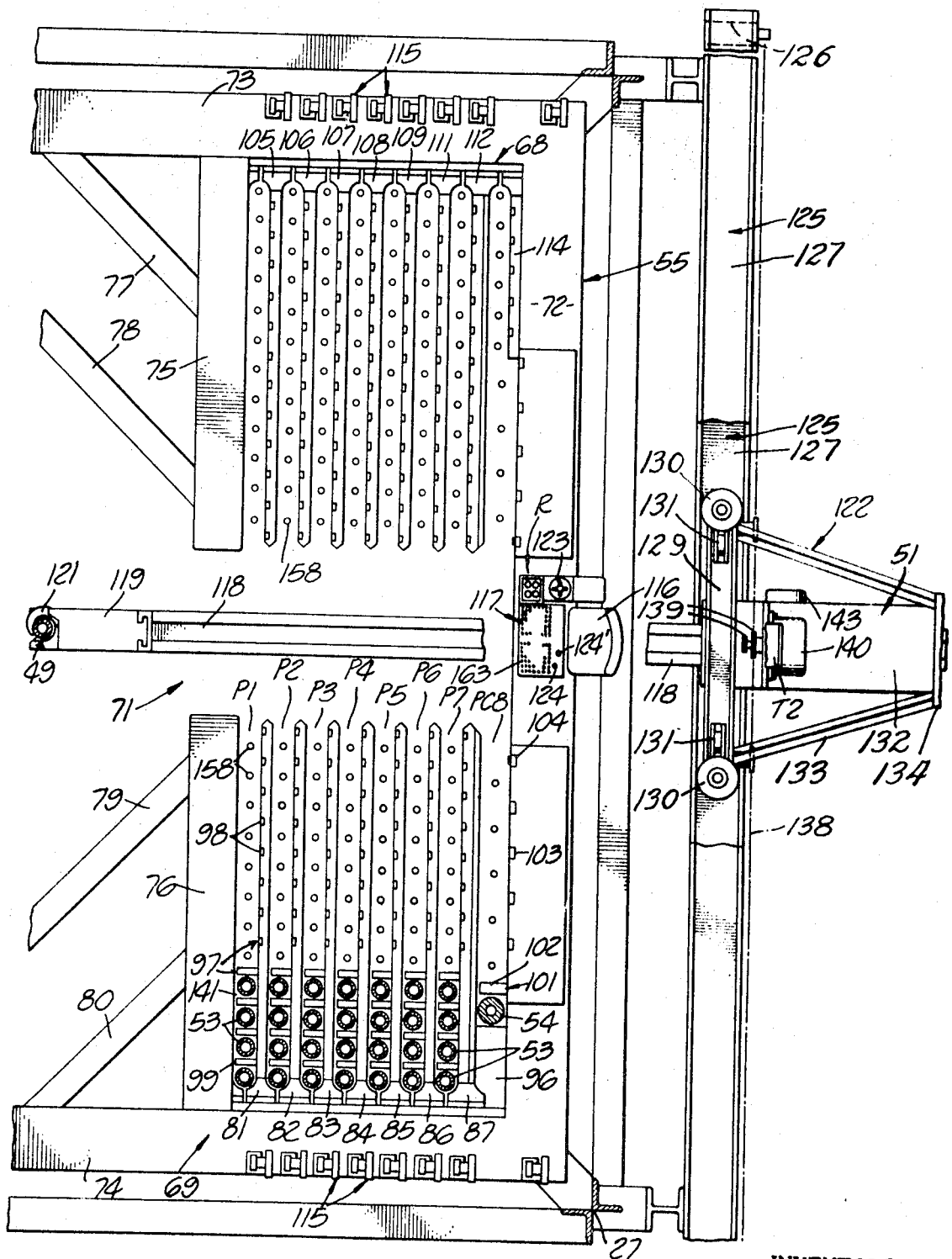
FIG. 3 is an enlarged fragmentary view showing in plan certain of the racking apparatus, and taken on the line 3-3 of FIG. 2.

Referring to FIG. 3, the finger board assembly 55 is shown as being in two sections; one, 68, located on the right-hand side and the other, 69, located on the left-hand side of space 71 extending laterally between the finger board sections 68 and 69 from the centerline of the well, which in FIG. 3 is at the center of the pipe stand 49. It is noted that this finger board assembly 55 may be positioned at a considerable height in the derrick 24, for example, approximately 90 feet above the platform 23.

The finger board assembly 55 has a rear or side rail 72 extending across the derrick man's side of the combined finger board assembly 55. Extending across the outer or closed side of the right-hand finger board section 68 is what may be termed the end rail 73, and extending across the left-hand outer end of the finger board section 69 is what may be termed the end rail 74. Extending inwardly from the end rails 73 and 74 are the front rails 75 and 76, respectively. The rails 72, 73, 74, 75 and 76 comprise the framework for supporting the finger board sections, and may be referred to as a walkaround. The front rails 75 and 76 may have appropriate braces 77, 78, 79 and 80.

Mounted on the end rail 74 are the drill pipe fingers 81, 82, 83, 84, 85 and 86, and one or more drill collar fingers 87. These fingers are mounted on their left-hand ends to extend horizontally toward a median vertical plane of the derrick and are spaced apart laterally from the front rail 76 to the drill collar rail 87 a distance sufficient to accommodate the size of drill pipe to be racked therein. The finger 87 is spaced from the side rail 72 a distance to accommodate the diameter of the drill collars to be racked therein. The space between the front rail 76 and the finger 81 is here shown at P1. This space extends from the outer end of the finger to the base of the finger near the rail 74 and has sufficient horizontal depth to accommodate a selected number of stands of pipe, in the illustration here shown as 12. The same holds true with respect to the spaces P2, P3, P4, P5, P6 and P7. The space PC8 between the drill collar finger 87 and the side rail 72 is greater than that between the other fingers, but the depth of the space is shown as being such that it will accommodate six stands of drill collars. The left-hand end of the space PC8 is shown as being closed by a gusset 96 which is preferably attached between the side rail 72 and the drill collar finger 87 and extends horizontally outward a distance to provide a support and reinforcement for the assembly and a stop for the first drill collar stand 54 racked therein.

Each of the fingers 81 through 87 has a series of spaced latches 97 spaced apart a sufficient distance to accommodate the diameter of a drill pipe, and extending from end to end of the fingers, there being shown in the illustration 12 such latches for each finger. The latches are indicated in their opened or raised position at 98, for example, and in the closed position at 99. In the opened position, pipe may be moved freely into and out of the openings between the fingers.

Similarly, the side rail 72 has a number of drill collar latches 101 extending for the length of the opening PC8 at spaced intervals. The drill collar latches are indicated closed at 102 and opened at 103 for a purpose similar to the opened and closed latches 97 of the racking fingers above described. At the outer end of the opening PC8, the drill collar latch, here designated 104, is shown as reinforced.

The right-hand racking board section 73 is provided with drill pipe fingers 105, 106, 107, 108, 109 and 111, to accommodate drill pipe, and with the drill collar finger 112. In general, these fingers are identical with the fingers 81 through 87 above described, and function the same way. The spaces between the fingers 105 to 112 are aligned with the pipe spaces P1 to P7, inclusive, at the other or left side of the derrick, and therefore may be termed right-hand spaces P1 to P7. The space between the drill collar finger 112 and the side rail 72, which is aligned with space PC8 and thus is a right space PC8, has, in the right-hand end thereof, what may be termed a stub finger 114 which reduces the width of the space between the drill collar finger 112 and the side rail 72 for the purpose of the racking of drill pipe between the stub rail 114 and the drill collar finger 112. However, between the end of the stub finger 114 and the open end of the right space PC8, provision is made for the racking of drill collars. The stub finger 114 has the same latch arrangement as the other fingers, and the drill collar latches are provided in connection with the side rail 72 the same as was the situation with respect to the left-hand racker section 69.

In each of the right- and left-hand spaces P1 to P7, the latches 93 define 12 spaces or compartments for drill pipe, while the right-hand space PC8 has 6 drill pipe spaces and 4 drill collar spaces, and the left-hand space PC8 has 6 drill collar spaces, these pipe and collar spaces sometimes being referred to as "compartments."

The various latches which cooperate with the fingers to define the drill pipe and collar spaces are not germane to the present invention, and their structure and mode of operation may be ascertained in detail by reference to Johnson and Turner, Jr., Finger Board and Racker Apparatus U.S. Pat. No. 3,501,017. However, these latches may be hydraulically operated. Therefore, in FIG. 3, there are shown on each end rail 73 and 74, manifolds 115, there being in the illustration shown one manifold for each racking finger. Each manifold contains suitable valve means and solenoids (not shown) for actuating the valves for each latch on the racking finger served thereby, together with hydraulic lines leading to the latch-actuating mechanism and electrical connections leading to a console switch under control of a derrick man.

In this connection, the derrick man (shown at "A" in FIG. 2) has a seat 116 and a console 117 preferably centered between right and left-hand racking sections 68, 69 and facing toward the center of the drilling derrick 24. This console has two banks of toggle switches schematically illustrated thereon, a switch for each latch and a row of switches for each racking finger.

There is also illustrated in FIG. 3 a portion of the upper racker means 51, including a racker arm 118 having a racker head 119 with pipe-guiding means 121, herein referred to as a hook or claw 121. Illustrated as being held in the claw 121 is the drill pipe 49. The racker arm 118 is mounted in a carriage 122 and has means, as will hereinafter be apparent, for extending and retracting the arm longitudinally. In addition, the carriage 122 is mounted in a horizontal track means or frame 125 extending horizontally along the side of the derrick, and has means, as will also hereinafter be apparent, under control of the derrick man for moving the carriage laterally in the track means from side to side of the derrick. Such racker arms and carriage means are actuated by hydraulic motors under control of a four-way valve, the control handle 123 being shown schematically on the right-hand side of the derrick man's console 117. This console 117 also has valve means indicated schematically at 124 and 124' for manipulating the racker head and claw for grasping and releasing the pipe 49. It is noted that the racker arm 118 normally will be at a height so that it may pass over the derrick man's station without interfering with his position.

Figure 4:
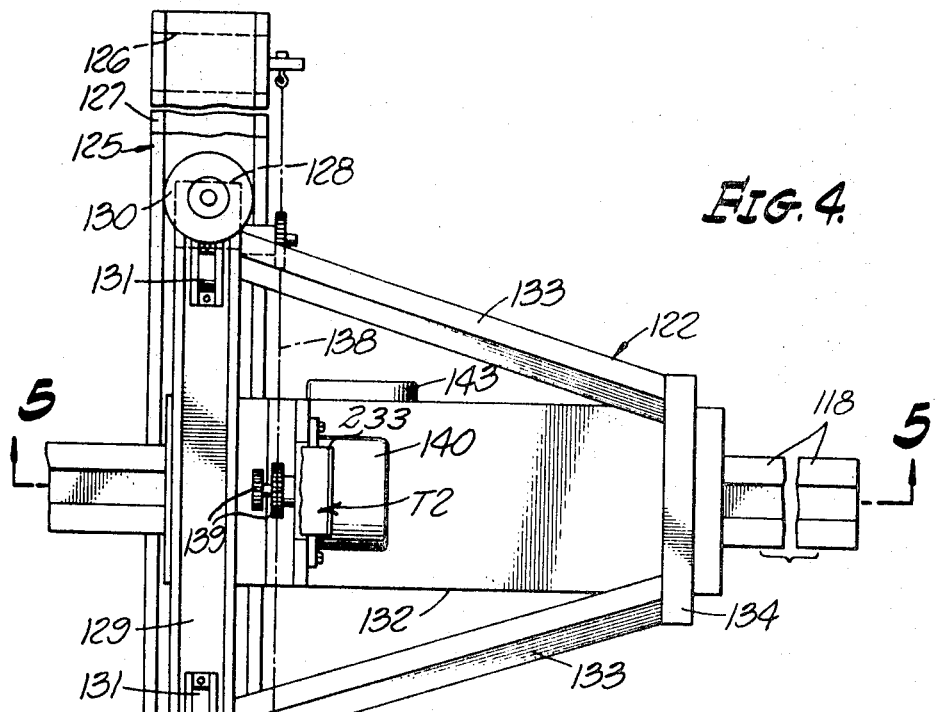
FIG. 4 is an enlarged fragmentary view showing the upper racker carriage and arm.
Figure 5:
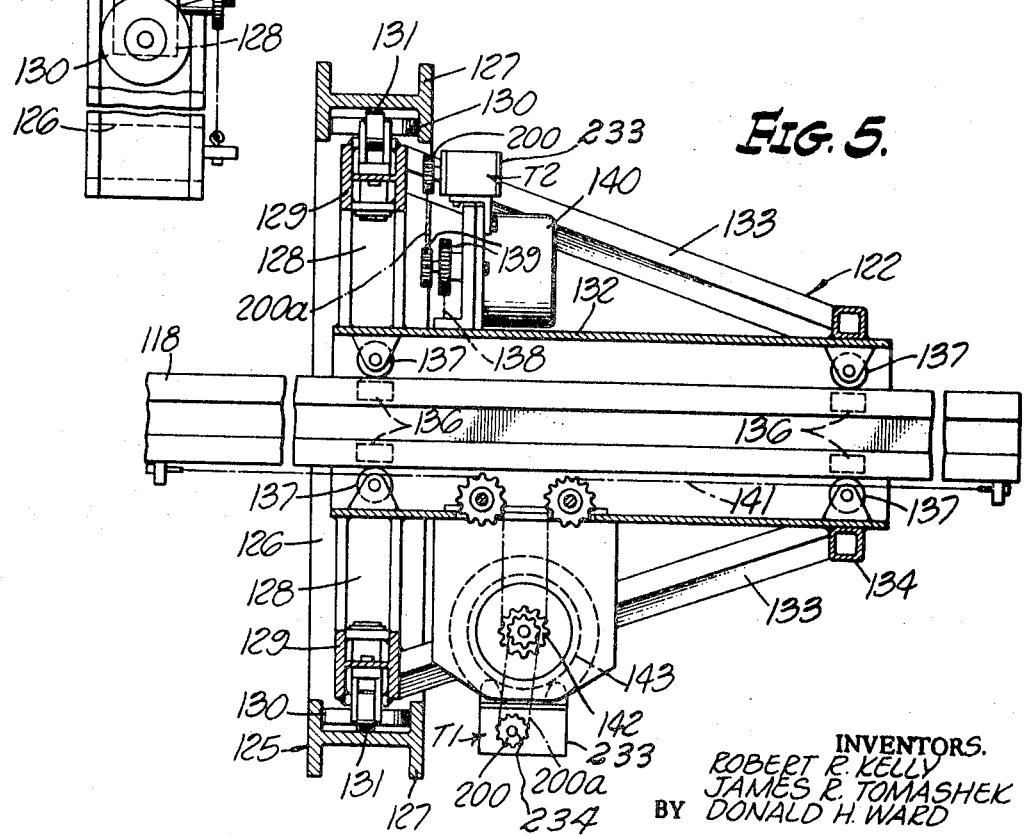
FIG. 5 is a view in vertical section, as taken on the line 5-5 of FIG. 4.

The general details of the carriage and frame structures 122 and 125 of the rackers 51 and 52 are shown by the illustration in FIGS. 4 and 5. The frame 125 comprises vertical side members 126 and horizontal channel members 127 interconnected at their ends and suitably reinforced to form a rigid rectangular frame suitably affixed to the side of the derrick. The carriage 122 also includes rigid side members 128 and top and bottom members 129 interconnected at their ends and forming a rectangular carriage support disposed between the structural members 126 and 127 of the frame 125. Suitable roller means, including upper and lower rollers 130 on the carriage support, are revolvable on vertical axes and are disposed in the frame channel members 127 to support the carriage against tilting; and other roller means, such as a number of rollers 131 revolvable on horizontal axes above and beneath the upper and lower carriage support members 129, engage in the channels of the horizontal channel members 127 to support the vertical load of the carriage 122 while facilitating movement of the carriage from side to side in the frame 125.

A hollow guide 132 is centrally supported in the carriage support members 128 and 129 by suitable rigid braces 133 and an outer rectangular carriage support 134. Reciprocable in the guide 132 is the rigid elongated racker arm 118 adapted to move longitudinally in the guide 132. Preferably, suitable rollers are interposed between the sides of the arm 118 and the inside of the guide 132, as indicated at 136, and other rollers 137 are interposed between the top and bottom of the arm 118 and the guide 132 so as to facilitate longitudinal movement of the arm 118, notwithstanding the fact that the arm may support a large weight at its end, namely, a stand or drill pipe 49 or drill collars 54.

Means are provided for effecting lateral movement of the carriage 122 within the frame 125, and, illustratively, such means comprises a drive chain 138 extending across the frame 125 and connected at its ends to the frame side members 126, the chain engaging a drive sprocket 139 adapted to be driven by a reversible motor 140, the motor being suitably mounted on the guide 132. Means are also provided for effecting longitudinal movement of the arm 118, and, illustratively, such means comprises a chain 141 extending longitudinally beneath the arm and attached at its opposite ends to the arm. A sprocket 142 driven by a reversible motor 143 acts to move the chain 141 and thus the arm longitudinally of the guide 132. In a manner requiring no further illustration, it will be understood that both of the chain drive motors 140 and 143 may be conventional hydraulic motors adapted to be operated in reverse directions in response to manipulation of suitable valve means (not shown) under control of the floor man B at the console 117b. A system for moving the racker arm 118, as well as the similar arms of the racker assemblies 52 and 62, is illustrated in the application for U.S. Letters Patent of John E. Ham, filed Nov. 26, 1968 Ser. No. 779,171, for Pipe Racking Control System.

Without requiring further illustration, it will be apparent that the upper pipe racker head 119 on the racker arm 118 may be constructed, including the provision of the previously described hook or claw 121 thereon, that said claw 121 may be opened or closed to confine an upper region of a stand of drill pipe, such as the stand 49 of FIG. 2, or a stand of drill collars, such as the stand 54 of FIG. 2, against lateral movement relative to the head 119; but the stand may be elevated and lowered relative to the head 119. Elevation and lowering of the pipe stand as previously indicated is accomplished by the cable 66 connected to the hydraulic actuator 67, as seen in FIG. 2, and also connected to a vertically shiftable racker head 152 which is slidably supported in a vertical frame 153 suitably secured to the inner end of a racker arm 135 of the intermediate pipe-racking assembly 52. Like the racker arm 118, the racker arm 135 is shiftably supported in another carriage 122 for longitudinal movement in response to operation of a motor like the motor 143, the carriage being laterally movable in another frame 125 by a motor like the motor 140 previously described. The racker head 152 of this racking assembly 52 is adapted to engage beneath a pipe joint to support the pipe stand 49 and move the same vertically away from the drill string 26 as pipe is being racked or to allow the pipe stand to move downwardly and be stabbed into the upper end of the drill string 26 during running of the drill pipe. The position indicator means of the present invention, as will hereinafter be described, may also be employed to indicate the position of the intermediate racker arm 135. In addition, while the means 62 of FIG. 2 has been previously described as casing handling apparatus, such means may include another head and claw means adapted to effect sliding engagement with the stand in certain pipe-handling operations.

In the use of the apparatus as described above, the stand of drill pipe 49 illustrated in FIG. 2 in a position disposed above and in alignment with the drill string 26 supported in the slips 59 may be either made up in the pipe string 26 or moved into the rack therefor. In the latter case, the derrick man A may effect operation of the motor 143 in a direction to effect retraction of the racker arm 118 of the upper racker means 51. The intermediate racker arm 135 will be similarly operated. When the stand of pipe 49 is retracted to a location aligned with the desired space P1—P7 between any of the racker fingers 81 through 87 or 105 to 112, the operator will arrest retraction of the racker arms 118 and effect lateral movement of the carriages 122 relative to the frames 125 of the racker means 51 and 52 by causing operation of the chain drive motors 140 in the desired direction, arresting such lateral movement when the stand is at the desired location between the fingers so as to be latched in place upon movement of the latch means 97 previously described to a pipe stand confining position. Thereafter, the racker head 152 may be lowered by the actuator cylinder 67 so as to allow the pipe stand to come to rest upon the racker base 56 which may, if desired, be provided with upstanding protuberances designated 158 in FIG. 3, for engagement in the open lower end of the pipe stand for holding the same against displacement responsive to pitch or roll of the vessel. Following this, the claw 121 is opened so that the racker head 119 and the racker head 152 may be moved in a reverse direction, that is, to the center space 71 of the rack assemblies and then towards a position at which the next stand of pipe may be picked up. During the operation of racking a stand as just described, the pipe-hoisting equipment, comprising the traveling block 35, the hook 38, the links 42 and the elevator 44, may be lowered so as to allow engagement of the next stand of pipe included within the drill string 26, so that the drill string may be elevated to a position for allowing removal therefrom of the next stand of pipe in response to operation of the power tong mechanism 58.

The operation of running the pipe stands will be understood without further description herein as being simply a reversal of the above-described operation. When drill collar stands 54 are to be run into the well or racked, as the case may be, the operations moreover are substantially the same as those described above.

POSITION INDICATOR MEANS

In the use of the racker apparatus it is desirable that the operating crew, such as the derrick man A and the floor man B, be capable of ascertaining the relationship of a drill pipe string or a drill collar string with respect to the centerline of the well, on the one hand, or with respect to the spaces P1 through PC8 at either the left-hand or right-hand side of the central space 71 between the finger board sections 68 and 69, on the other hand.

Under some circumstances it is difficult for the crewman to visually determine the precise location of the pipe or collar string; and, therefore, in accordance with the present invention, indicator means are provided whereby to provide at a remote location, such as at the derrick console 117 and/or the floor console 117b, a visual indication of the position of the pipe string or collar string supported in the racker head 119 of the upper pipe racker apparatus 51 or the corresponding racker head 152 of the intermediate pipe racker apparatus 52. Thus, as represented at R in FIGS. 3 and 6, there may be a position-indicating receiver located adjacent the derrick man's console 117, and it will be understood without need of illustration that a similar receiver may be indicated at the floor man's console 117b.

Figure 9:
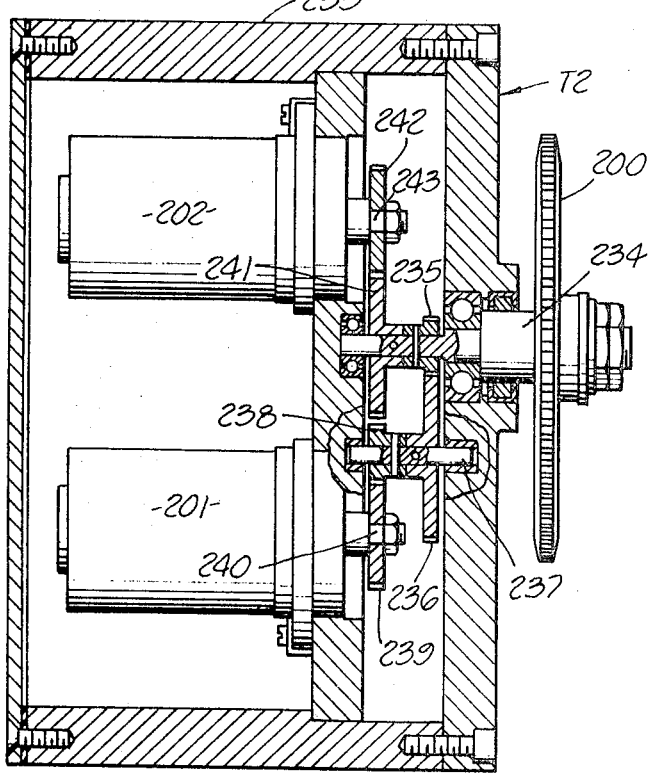
FIG. 9 is a detail view in section showing one of the position indicator transmitters.

Indicator transmitter means are provided which, in the illustrative embodiment, comprise a transmitter T1 for transmitting a signal to the receiver R indicative of the relative longitudinal position of the racker arm 118, and therefore the racker head 119, and a second transmitter T2 is employed for producing a signal indicative of the lateral disposition of the racker arm 118 and, more particularly, the lateral disposition of the carriage 122 which supports the arm 118. See FIGS. 3— 6. As will hereinafter be more fully described, a typical transmitter is shown in FIG. 9. Generally, however, each of the transmitters T1 and T2 includes a drive sprocket 200 adapted to be driven by a chain 200a, as seen in FIGS. 5, 6 and 9, the chains 200a respectively being driven by the shafts of the motors 143 and 140 whereby the racker arm 118 and the carriage 122 are effectively caused to move during the pipe racking and unracking operations.

Figure 6:
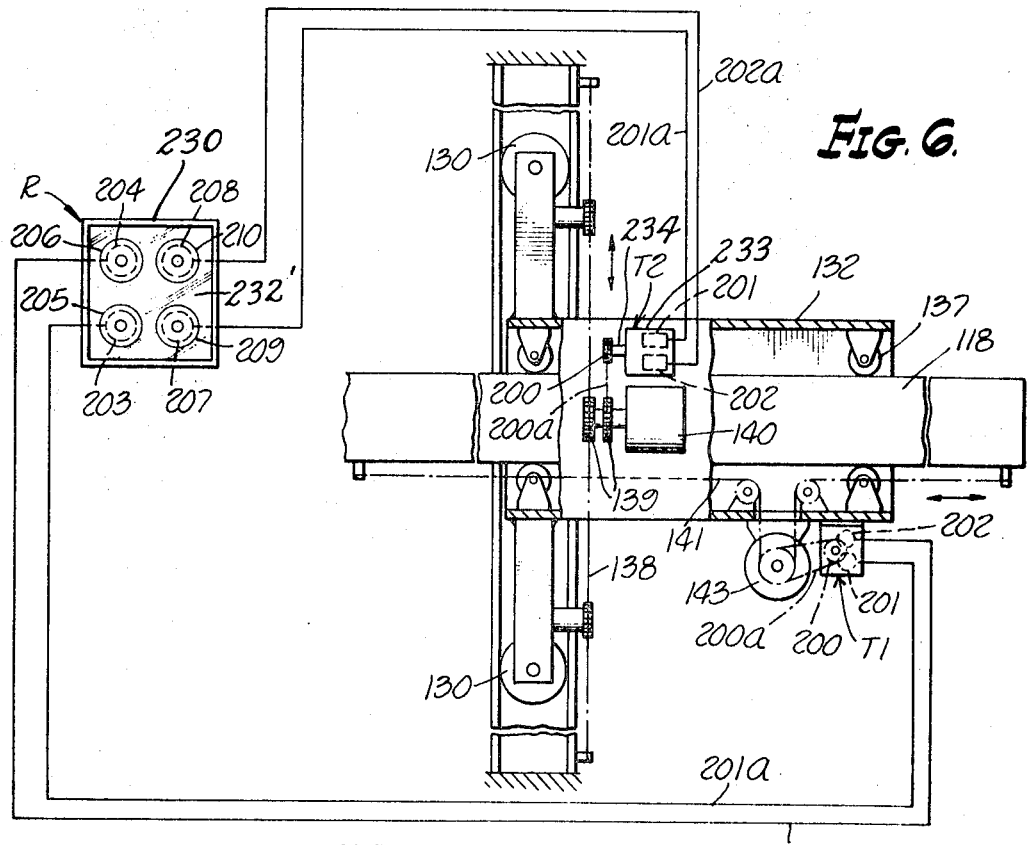
FIG. 6 is a schematic illustration of the application of position indicating means of the invention to the racker apparatus.

This arrangement is schematically illustrated in FIG. 6, in which the transmitter T1 is shown as fixed beneath the hollow support 132 in which the racker arm 118 is shiftably disposed, the transmitter T1 being chain driven from the motor 143 as the motor 143 effects longitudinal extension and retraction of the racker arm 118; and the transmitter T2 being located adjacent the motor 140 and being chain driven therefrom as the motor 140 effects lateral movement of the carriage 122. The transmitter T1 includes a first synchro generator 201 and a second synchro generator 202, these synchro generators 201 and 202 being connected by circuits generally denoted at 201a and 202a with synchro motors 203 and 204 in the position indicator receiver R. These synchro motors 203 and 204 are adapted to drive indicator dials 205 and 206, respectively, angularly and proportionately in relation to the angular movement of the synchro generators 201 and 202 of the transmitter T1. It will be understood that the synchro generators 201 and 202 and the synchro motors 203 and 204 may comprise the conventional synchro systems, without need of further description, and that the synchro generators 201 and 202 will be driven by the arm shifting motor 143 through the gear 200 in a manner hereinafter to be more fully described.

The transmitter T2 is generally seen in FIG. 6 to be similar to the transmitter T1 and, like the latter, has synchro generators 201 and 202 connected by circuits 201a and 202a to synchro motors 207 and 208 similar to the synchro motors previously described. These synchro motors 207 and 208 are adapted to drive indicator dials 209 and 210 of the receiver R in response to lateral movement of the carriage 122 under the influence of the motor 140.

The dials 205, 206 and 209, 210 of the position-indicating receiver R are best illustrated in FIG. 7. The two dials, 205 and 206, show the "IN AND OUT" position of the racker head 119 as it is moved by the racker arm 118. The dial 205 registers the "COARSE" movement. On this dial are printed radial lines that correspond to the well centerline, as indicated at 211, and the eight finger board spaces P1 through PC8 of the right-hand and left-hand finger board sections 68 and 69. A reference marker 212 is provided at a stationary location adjacent the dial 205 so that the approximate location of the racker head, and therefore the pipe or collar supported thereby, will be indicated by the relationship of the stationary marker 212 and the various spaced markings on the rotatable dial.

The exact or "FINE" location of position is shown by the dial 206 which is provided with a shaded area 213. When the center of the shaded area is aligned with one of a number of stationary markings adjacent the dial 206, the exact position of the racker head 119 will be indicated. In the illustrative embodiment, the stationary markings include at 214 a marking for the well centerline, at 215 a marker for positions P1 through P7, and at 216 a marker for the position PC8. With the two dials 205 and 206 in the position shown in FIG. 7, it is indicated that the racker head, and therefore the length of pipe supported thereby, is precisely located at the well centerline, as illustrated in FIG. 2 and in FIG. 3. When so positioned, the length of pipe may be made up or broken out of the well-drilling string and moved to a position for racking. Otherwise, the dials 205 and 206 serve merely to show the general relationship of the pipe stand 49 to the well centerline in the space 71 between the finger board sections 68 and 69. The position of the pipe stand 49, and therefore the racker head 119, to the right or to the left of the space 71 in either the right or left spaces P1 through PC8, is indicated by the other set of dials 209 and 210.

"COARSE" dial 209 has radial demarcations imprinted thereon representing the "WELL CENTERLINE" and the "RIGHT" and "LEFT" racking positions between the latches carried by the fingers of the finger board sections 68 and 69, of which racking positions there are 12 pipe positions, six left collar positions, and four right collar positions. The position of the racker head 119 is roughly indicated when one of these radial demarcations is aligned with a stationary marker 217 located adjacent the dial 209. The other dial 210 is adapted to indicate the "FINE" or exact position of the pipe racker head 119 to the right or to the left of the space 71 in the right or left spaces P1 through PC8, this dial 210 having a shaded area 218 which is adapted to be aligned with one of the stationary arrows provided adjacent the dial 210 and labeled at 219 to denote the well centerline, and also labeled "LEFT 1, 3, 5 COLLAR," and "RIGHT PIPE 2 & 4 COLLAR," "LEFT PIPE 2, 4, and 6 COLLAR," "RIGHT 1 and 3 COLLAR."

In the illustrated positions the dials 209 and 210, like the dials 205 and 206, indicate that the racker head 119, and therefore the pipe supported thereby, is centrally located in the space 71 on a plane which would intersect the well centerline. When the carriage 122 is moved either to the right or to the left, the dial 209 will indicate approximately how far the racker head has been moved and in which direction, and the dial 210 will indicate when the pipe is located at one of the numbered spaces 1 through 12, for example.

Referring to FIG. 8, a pair of the dials 209 and 210 is shown as being enclosed within an upper portion 230 of a housing 231 and being so located as to be illuminated by light bulbs 232 which facilitate viewing of the dials through a transparent closure 232' provided atop the housing section 230. Within the housing 231 are the motors 207 and 208 which drive the dials 209 and 210, as previously described.

Referring to FIG. 9, a typical transmitter is illustrated, for purposes of description, at T2, which comprises a housing 233 in which are the synchro generators 201 and 202. As previously described with respect to FIG. 6, the synchro generator 201 is adapted to effect synchronous operation of synchro motor 203 and the synchro generator 202 is adapted to effect synchronous operation of the synchro motor 204, the synchro generator 201 therefore being adapted to effect the drive of the "COARSE" dial and the synchro generator 202 being adapted to effect operation of the "FINE" dial of the receiver.

Thus, the transmitter sprocket 200 is adapted to drive a shaft 234 which extends into the housing 233. In the housing the shaft 234 supports a small gear 235 which is in mesh with a larger gear 236 on shaft 237. Effectively keyed to the shaft 237 is a small gear 238 which is in mesh with a larger gear 239 on the shaft 240 of the synchro generator 201. Also driven by the shaft 234 is an inner gear 241 which is in mesh with a small gear 242 of the motor shaft 243 of the synchro generator 202. Thus, the gears 235, 236, 238 and 239 provide a substantial reduction drive to the synchro generator 201 which reflects the gross or coarse movements of the racker arm longitudinally with respect to the well centerline and the rack sections 68 and 69, and the gears 241 and 242 effect a drive to the synchro generator 202 which reflects the fine movements of the racker arm with respect to the well centerline and the rack sections 68 and 69.

While the apparatus has been described above as visually indicating the position of the racker arm 118, it will be understood that similar means may be employed to indicate the position of the intermediate racker arm 135 as well as the similar arm of the casing-handling structure 62. Moreover, it is within the purview of the invention that the indication of position may involve the completion of a control function in automated equipment, and as defined in the claims the indicator means should be so construed. In other words, the positioning of the arm 118 at the well centerline or in any racking position may result in the triggering of the next step in the operation of an automated pipe handling system.

What we claim is:

1. In well-drilling derrick apparatus of the type having spaced-apart sides with rack means for receiving pipe stands and supporting the same in spaced vertical positions, said rack means including a plurality of fingers disposed in parallel spaced relation with respect to a side of said derrick, racker means for moving said pipe stands into and out of said rack means, said racker means including a longitudinally extended racker arm, means for supporting said racker arm for longitudinal movement in a horizontal plane between projected and retracted positions relative to said rack means and for movement laterally with respect to said rack means to place said pipe stands between said fingers, a racker head carried by said racker arm, said racker head including means selectively and releasably engageable with a shoulder on said pipe stands, and means for moving said arm longitudinally and laterally, the improvement comprising in combination therewith:
   a. indicator means driven by said racker means positionable in response to longitudinal and lateral movement of said racker arm for indicating the relationship of said racker head with respect to said fingers and the vertical center of said derrick;
   b. receiver means representing longitudinal and lateral movements of said racker arm included in said indicator means;
   c. said receiver means including synchro motor means for driving said receiver means; and
   d. transmitter means including synchro generator means adjustably responsive to movements of said racker arm to adjust said synchro motor means.

2. Well-drilling derrick apparatus as defined in claim 1, wherein said indicator means includes a receiver having means adjustably positionable at locations representative or positions of said racker head, and transmitter means operably responsive to movements of said arm to adjust said receiver means.

3. Well-drilling derrick apparatus as defined in claim 1, wherein said indicator means includes a receiver having dials representing coarse and fine movements of said racker arm, synchro motor means for driving said dials, and synchro generator means adjustably responsive to movements of said racker arm to adjust said synchro motor means.

4. Well-drilling derrick apparatus as defined in claim 1, wherein said indicator means includes a receiver having a first member adjustably positionable at locations representative of coarse positions of said racker head, and a second member adjustably positionable at locations representative of fine positions of said racker head.

5. Well-drilling derrick apparatus as defined in claim 1, where said indicator means includes a receiver having a first member adjustably positionable at locations representative of coarse positions of said racker head, a second member adjustably positionable at locations representative of fine positions of said racker head, and transmitter means operably responsive to movements of said arm to adjust said first and second receiver members.

6. Well-drilling derrick apparatus as defined in claim 1, wherein said indicator means includes a receiver having a first pair of members adjustably positionable at locations representative of the longitudinal movements of said racker arm, and a second pair of members adjustably positionable at locations representative of the lateral positions of said arm.

7. Well-drilling derrick apparatus as defined in claim 1, wherein said indicator means includes a receiver having a first pair of members adjustably positionable at locations representative of the longitudinal movements of said racker arm, and a second pair of members adjustably positionable at locations representative of the lateral positions of said arm, each of said pairs of members including a first member adjustably positionable at locations representative of coarse positions of said racker head and a second member adjustably positionable at locations representative of fine positions of said racker head.

8. Well-drilling derrick apparatus as defined in claim 1, wherein said indicator means includes a receiver having a first pair of members adjustably positionable at locations representative of the longitudinal movements of said racker arm, and a second pair of members adjustably positionable at locations representative of the lateral positions of said arm, each of said pairs of members including a first member adjustably positionable at locations representative of coarse positions of said racker head and a second member adjustably positionable at locations representative of fine positions of said racker head, and transmitter means operably responsive to movements of said arm to adjust said pairs of receiver members.

9. Well-drilling derrick apparatus as defined in claim 1, wherein said indicator means includes a receiver having a first pair of members adjustably positionable at locations representative of the longitudinal movements of said racker arm, and a second pair of members adjustably positionable at locations representative of the lateral positions of said arm, each of said pairs of members including a first member adjustably positionable at locations representative of coarse positions of said racker head and a second member adjustably positionable at locations representative of fine positions of said racker head, transmitter means operably responsive to movements of said arm, and means for adjusting said pairs of indicator members in response to said transmitter means.

10. Well-drilling derrick apparatus as defined in claim 9, wherein said means for adjusting said pairs of indicator members comprises synchro motors, and said transmitter means includes synchro generators connected to said synchro motors and means for driving said synchro motors in response to movement of said racker arm.

11. In well-drilling derrick apparatus having spaced-apart sides and having rack means for receiving stands of drill pipe and drill collars and supporting the same in spaced vertical positions at one side of said derrick and racker means including a racker head for moving said stands between said rack means and the vertical center of said derrick; the improvement including transmitter means having synchro generator means operable by said racker means and receiver means having synchro motor means driven by said transmitter means said synchro motor means included in receiver means to indicate the position of said racker head with respect to said centerline of said derrick and said rack means.